United States Patent Office 3,006,932
Patented Oct. 31, 1961

3,006,932
PRODUCTION OF ERGOSTEROL FROM YEAST
Joseph Green, London, Stanley Albert Price, Crawley, and Elisha Eliazer Edwin, Surbiton, England, assignors to Vitamins Limited, London, England, a British company
No Drawing. Filed May 8, 1956, Ser. No. 583,358
Claims priority, application Great Britain May 12, 1955
11 Claims. (Cl. 260—397.25)

This invention relates to the production of ergosterol.

Ergosterol is a plant sterol which is of industrial and commercial importance, since it can be readily converted to many therapeutically useful substances, such as ergocalciferol (vitamin $D_1$) and several adrenal cortical and sex hormones. Ergosterol occurs naturally in a wide variety of vegetable sources, and is especially found in yeasts, moulds and fungi. On an industrial scale, ergosterol is mainly prepared from yeast, which contains a high proportion of ergosterol. For this purpose, special strains of yeast are selected for their ergosterol content, which is also often improved by special methods of cultivation of the yeast. For example baker's yeast (*Saccharomyces cerevisiae*), brewer's yeast (*S. cerevisiae*) and *Saccharomyces carbergensis* all contain large amounts of ergosterol and may be used for the production of the latter.

Ergosterol is a lipoid-soluble substance, but it is well-known that it cannot be extracted with any degree of efficiency from yeast (whether in the natural, compressed or dried form) by conventional methods of solvent extraction. Thus, exhaustive extraction of yeast with hot ethyl alcohol or benzene, although extracting most of the fatty portion of the yeast, yet only recovers less than a quarter of the ergosterol which is present in the yeast. It has been postulated, therefore, that the ergosterol is present in a bound form in the yeast cells, and it is well-known that a preliminary degradation of the yeast cells is necessary before the ergosterol can be efficiently extracted (cf. Shaw and Jeffries, Analyst (1953), 78, 515).

The way in which ergosterol is bound in the yeast cell is not known. However, the binding is strong, since not all methods of cell degradation serve to liberate the ergosterol. To liberate the ergosterol, methods used in the past have involved drastic hydrolytic action of the chemical reagents. For example, simple plasmolysis of yeast with ethyl acetate, followed by autolysis, does not yield free ergosterol, although cell degradation takes place, and such a process must be followed by a drastic chemical hydrolysis to liberate the sterol. Similarly, attempts to liberate the sterol by preliminary enzymatic digestion have not succeeded. On an industrial scale, ergosterol is therefore obtained from yeast by the preliminary digestion of the yeast cells by hot alkalies, followed by solvent extraction. A number of such processes are described, for example, in British specifications Nos. 292,133 and 322,465; U.S.A. specifications Nos. 1,733,009, 1,912,440, 1,941,097 and 2,395,115; and German specification No. 553,915.

In some of these, preliminary proteolysis or enzymatic digestion is used as an adjunct to the saponification procedure.

All these previously described methods suffer from the disadvantage that recovery of ergosterol is accompanied by the more or less total destruction of the yeast, which is then no longer of any economic value. Thus, since its protein is destroyed, its value as an animal feeding stuff is rendered very low.

It has now been found according to this invention that ergosterol can be readily obtained from yeast, without subjecting the yeast to drastic hydrolysis with alkalies or other strong hydrolysing agents, whereby the yeast may be recovered in a useful form after the ergosterol has been recovered. Thus, the residual yeast has a high nutritional value and may be incorporated in animal feeding stuffs.

The present invention provides in a process for the production of ergosterol from yeast, the step of subjecting the yeast to the action of a water-soluble amino compound which is a base having a dissociation constant between $1\times10^{-6}$ and $1\times10^{-2}$ to liberate the bound ergosterol.

The water-soluble amino compound may be of the general formula:

where $R_1$, $R_2$ and $R_3$ are the same or different and are hydrogen atoms, alkyl radicals, substituted alkyl radicals or cycloalkyl radicals. Alternatively, the amino compound may be a saturated ring compound containing a nitrogen atom in the ring, such as piperidine or morpholine. Alternatively, the amino compound may be in the form of a quaternary base, such as choline.

We have discovered that the aforesaid water-soluble compounds are capable of liberating the bound ergosterol from the yeast cells, and the ergosterol can then be recovered from the yeast by the processes hereinafter described, while the remainder of the yeast is almost totally recovered and is of high nutritional value, having its protein almost unimpaired.

Examples of amino compounds which can be used in the process of the present invention are ammonia, methylamine, dimethylamine, trimethylamine, ethylamine, diethylamine, triethylamine, cyclohexylamine, piperidine, benzylamine, morpholine, triethanolamine and choline. The first ten compounds named above are preferred.

The liberation of the ergosterol is usually accomplished as follows: The compressed yeast (containing about 70% by weight of water) is intimately mixed with the water-soluble amino compound which may itself be diluted with water. Amounts of amino compound varying from 0.5% to 20% calculated on the weight of the yeast may be used; ordinarily we use 1 to 5% but these proportions are not limiting. The yeast is then allowed to stand (with or without stirring) at room temperature for a time which may vary between three hours and three days. Alternatively, the yeast may be heated to higher temperatures, between 20° C. and 100° C. for much shorter times. Such increased temperatures serve to shorten the time required for the liberation of ergosterol from the yeast.

The liberation of ergosterol may be readily demonstrated by extracting a small quantity of the yeast, before and after the treatment with the water-soluble amino compound, with ether or other inert solvent, and testing the solution with the well-known Liebermann-Burchard reagent for sterols. The solution from the untreated yeast gives either a negative or faint positive reaction, but the solution from the yeast treated with the water-soluble amino compound gives a very strong positive reaction.

The mechanism by which this release of ergosterol from the bound form takes place is not fully understood but it is thought that two factors are involved. Firstly, many amino compounds, even in small amounts, plasmolyse yeast very rapidly, the whole being rapidly broken down to an aqueous slurry. It has been observed by us that such plasmolysis is a necessary preliminary to the process of ergosterol extraction. Thus, cyclohexylamine is much more rapid in its plasmolytic action than ammonia and the rate of ergosterol liberation is faster with the former amine than with the latter. However, plasmolysis alone does not liberate the ergosterol, since it is well known that many organic solvents (such as ethyl acetate and toluene) plasmolyse yeast but do not liberate ergosterol in extractable form. Secondly, the effectiveness of the amino compound is no doubt linked to its basicity. The ergosterol release appears to be brought about by a hydrolysis of the bond retaining the ergosterol to the cell, under exceptionally mild conditions. Thus, ammonia and cyclohexylamine are more alkaline than the more highly substituted or ring amines and this fact appears to be linked to the extent and speed of their action. It is interesting that the strong bases, such as caustic soda, caustic potash, baryta, do not liberate ergosterol under the conditions of the present invention.

A further part of the process, which is carried out after the liberation of ergosterol has been accomplished is the extraction of the sterol. To be extracted efficiently, the reacted yeast is now mixed with an alcohol containing less than four carbon atoms in the molecule, such as methanol or ethanol, usually in an amount 2 to 10 times the volume of the yeast. The yeast solids are separated, for example by filtration and then extracted with a solvent for ergosterol, such as diethyl ether, ethyl acetate or others well-known in the art.

This addition of the alcohol (which removes the aqueous part of the yeast) is an important part of the process. The extraction of the yeast solids with the aqueous alcohol removes a certain amount of gummy and proteinaceous matter which we have found prevents the maximum extraction of the ergosterol.

Thus, there are two dependent parts of the process. First, the process of liberation of ergosterol; second, the process of alcohol washing to remove substances hindering efficient extraction.

Modifications of the process may be used. Thus, the alcohol extraction of the water and gums may take place before the stage of ergosterol release by the amino compound. Again, after carrying out the treatment with the amino compound as first described, some of the water can be removed by a process of centrifuging, before carrying out the alcohol washing stage.

The following examples illustrate the invention:

*Example 1*

1 kg. of compressed yeast (72% moisture content: containing on analysis 0.45% by weight of ergosterol) was mixed with 200 mls. of a 10% aqueous solution of cyclohexylamine. Rapid plasmolysis occurred, and the suspension was kept at 50° C. for 1½ hrs. After cooling to room temperature, methanol (4 litres) was added with stirring. The mixture was filtered and the yeast solids washed with a little more methanol. The filter cake was then extracted with hot ethyl acetate three times. The ethyl acetate solution was evaporated to give a semi-solid mass which, by analysis, was found to contain 90% of the original ergosterol.

The yeast residue represented about 90% of the original (on a dry weight basis) and had a protein content of 47%. The yeast was very suitable for use as an animal feeding stuff.

*Example 2*

1 kg. of compressed yeast (assay as in Example 1) was treated with 40 ml. of 0.880 ammonia (previously diluted five times with water). The mixture was stirred and heated to 100° C. for two hours. After cooling, and adding methanol as in Example 1, the process was continued as described in Example 1. Recovery of ergosterol in the ethyl acetate extract exceeded 80%. The yeast residue represented 88% of the original and had high nutritional value.

*Example 3*

1 kg. of compressed yeast (assay as in Example 1) was treated with 40 ml. of diethylamine (previously diluted five times with water). The mixture was allowed to stand for 24 hours at room temperature. After processing as in Example 1, 85% of the original ergosterol was recovered in the ethyl acetate extract. The yeast residue represented nearly 90% of the original and had high nutritional value.

*Example 4*

500 grams of compressed yeast (assay as in Example 1) was treated with 20 ml. of piperidine (previously diluted with five parts of water). After standing at room temperature for 24 hours, 85% of the original ergosterol in the yeast was extracted by processing as in Example 1, except that ethanol replaced methanol as the alcohol used. The residual yeast had a protein content of 45% and represented over 90% of the original yeast used (on a dry weight basis).

*Example 5*

500 grams of compressed yeast (assay as in Example 1) was treated as in Example 4, except that benzylamine replaced piperidine. Similar results to Example 4 were obtained.

What we claim is:

1. In a process for the production of ergosterol from yeast the step of subjecting the yeast while moist and while retaining yeast protein substantially unimpaired to the action of a catalytic, non-solvent amount of a water-soluble amino compound which is a mild base having a dissociation constant between $1 \times 10^{-6}$ and $1 \times 10^{-2}$ to liberate the bound ergosterol, the proportion of amino compound being between 0.5 and 5%, by weight, calculated on the yeast.

2. In a process for the production of ergosterol from yeast the step of subjecting the yeast while moist and while retaining yeast protein substantially unimpaired to the action of a catalytic, non-solvent amount of a water-soluble amino compound which is a mild base having a dissociation constant between $1 \times 10^{-6}$ and $1 \times 10^{-2}$ said base being of the general formula:

where $R_1$, $R_2$ and $R_3$ are each selected from the group consisting of hydrogen, alkyl radicals, substituted alkyl radicals and cycloalkyl radicals, to liberate the bound ergosterol, the proportion of amino compound being between 0.5 and 5%, by weight, calculated on the yeast.

3. In a process for the production of ergosterol from yeast the step of subjecting the yeast while moist and while retaining yeast protein substantially unimpaired to the action of a catalytic, non-solvent amount of a water-soluble amino compound which is a mild base having a dissociation constant between $1 \times 10^{-6}$ and $1 \times 10^{-2}$, said base being a saturated ring compound containing a nitrogen atom in the ring, to liberate the bound ergosterol, the proportion of amino compound being between 0.5 and 5%, by weight, calculated on the yeast.

4. In a process for the production of ergosterol from yeast the step of subjecting the yeast while moist and while retaining yeast protein substantially unimpaired to the action of a catalytic, non-solvent amount of a water-soluble amino compound which is a quaternary base having a dissociation constant between $1 \times 10^{-6}$ and $1 \times 10^{-2}$, to liberate the bound ergosterol, the proportion of amino compound being between 0.5 and 5%, by weight, calculated on the yeast.

5. A process for the production of ergosterol from yeast which comprises subjecting the yeast while moist and while retaining yeast protein substantially unimpaired to the action of a catalytic, non-solvent amount of a water-soluble amino compound which is a mild base having a dissociation constant between $1 \times 10^{-6}$ and $1 \times 10^{-2}$ to liberate the bound ergosterol, treating the reacted yeast with an alcohol having 1 to 2 carbon atoms in the molecule to remove gummy and proteinaceous matter and thereafter recovering the ergosterol by solvent extraction, the proportion of amino compound being between 0.5 and 5%, by weight, calculated on the yeast.

6. In a process for the production of ergosterol from yeast the steps of treating the yeast with an alcohol containing less than four carbon atoms in the molecule to remove gummy and proteinaceous matter and thereafter subjecting the treated yeast while moist and while retaining yeast protein substantially unimpaired to the action of a catalytic, non-solvent amount of a water-soluble amino compound which is a mild base having a dissociation constant between $1 \times 10^{-6}$ and $1 \times 10^{-2}$ to liberate bound ergosterol, the proportion of amino compound being between 0.5 and 5%, by weight, calculated on the yeast.

7. In a process for the production of ergosterol from yeast the step of subjecting the yeast while moist and while retaining yeast protein substantially unimpaired to the action of a catalytic, non-solvent amount of cyclohexylamine to liberate the bound ergosterol, the proportion of the amine being between 0.5 and 5%, by weight, calculated on the yeast.

8. In a process for the production of ergosterol from yeast the step of subjecting the yeast while moist and while retaining yeast protein substantially unimpaired to the action of a catalytic, non-solvent amount of ammonia to liberate the bound ergosterol, the proportion of ammonia being between 0.5 and 5%, by weight, calculated on the yeast.

9. In a process for the production of ergosterol from yeast the step of subjecting the yeast while moist and while retaining yeast protein substantially unimpaired to the action of a catalytic, non-solvent amount of diethylamine to liberate the bound ergosterol, the proportion of the amine being between 0.5 and 5%, by weight, calculated on the yeast.

10. In a process for the production of ergosterol from yeast the step of subjecting the yeast while moist and while retaining yeast protein substantially unimpaired to the action of a catalytic, non-solvent amount of piperidine to liberate the bound ergosterol, the proportion of the amine being between 0.5 and 5%, by weight, calculated on the yeast.

11. In a process for the production of ergosterol from yeast the step of subjecting the yeast while moist and while retaining yeast protein substantially unimpaired to the action of a catalytic, non-solvent amount of benzylamine to liberate the bound ergosterol, the proportion of the amine being between 0.5 and 5%, by weight, calculated on the yeast.

References Cited in the file of this patent

UNITED STATES PATENTS

| | | |
|---|---|---|
| 1,213,545 | Ringler | Jan. 23, 1917 |
| 1,840,756 | Walz et al. | Jan. 12, 1932 |
| 2,220,114 | Natelson et al. | Nov. 5, 1940 |
| 2,355,661 | Light | Aug. 15, 1944 |
| 2,395,115 | Goering | Feb. 19, 1946 |
| 2,753,362 | Owades | July 3, 1956 |